United States Patent [19]

Marzocchi et al.

[11] 4,335,186

[45] Jun. 15, 1982

[54] CHEMICALLY MODIFIED ASPHALT COMPOSITIONS

[75] Inventors: Alfred Marzocchi; Michael G. Roberts; Charles E. Bolen, all of Newark, Ohio

[73] Assignee: Owens-Corning Fiberglas Corporation, Toledo, Ohio

[21] Appl. No.: 40,368

[22] Filed: May 18, 1979

Related U.S. Application Data

[62] Division of Ser. No. 852,898, Nov. 18, 1977, Pat. No. 4,166,752.

[51] Int. Cl.$^3$ .................. C08L 95/00; D02G 3/18; D02G 3/36
[52] U.S. Cl. ..................... 428/375; 106/281 N; 106/282; 428/378; 428/440
[58] Field of Search ............... 106/281 N, 282; 428/375, 378, 440

[56] References Cited

U.S. PATENT DOCUMENTS

| | | | |
|---|---|---|---|
| 2,461,971 | 2/1949 | Fischer | 106/281 N |
| 2,534,713 | 12/1950 | Hankins | 106/281 N |
| 2,582,824 | 1/1952 | Fowkes | 106/281 N |
| 2,716,616 | 8/1955 | Rendall et al. | 106/282 |
| 3,997,354 | 12/1976 | Pivette et al. | 106/281 N |

FOREIGN PATENT DOCUMENTS

2032007  1/1971  Fed. Rep. of Germany ...... 428/375

*Primary Examiner*—Allan Lieberman
*Attorney, Agent, or Firm*—Ronald C. Hudgens; Patrick P. Pacella; Keith V. Rockey

[57] ABSTRACT

Chemically modified asphalt compositions prepared by reaction of asphalt with ammonia, a polyamine or an aromatic diamine. The chemically modified asphalt compositions of this invention are particularly well suited for use in the treatment of glass fibers as reinforcement for asphalt matrices.

3 Claims, No Drawings

CHEMICALLY MODIFIED ASPHALT COMPOSITIONS

This is a division of application Ser. No. 852,898, filed Nov. 18, 1977, now U.S. Pat. No. 4,166,752.

This invention relates to chemically modified asphalt compositions, and more particularly to asphalt compositions which have been chemically modified to increase fire retardancy and chemical reactivity to promote compatibility between asphalt and reinforcements therefor.

As is well known to those skilled in the art, asphalt is a cementitious material containing predominantly bitumins which occur in nature as such, or are obtained as the residue in the refining of petroleum. It has been determined that chemically, asphalt is made up of condensed hydrocarbon rings; the condensed hydrocarbon rings, however, contain various reactive groups, notably carbon-to-carbon double bonds. In terms of distribution, asphalt is much like a plastisol in that it is formed of graphitic particles suspended in a viscous liquid. The particles are of the same chemical type but differ from each other in molecular weight. Thus, the liquid phase of asphalt is formed predominantly of lower molecular weight condensed hydrocarbon rings, whereas the graphitic particles suspended therein are made up primarily of high molecular-weight condensed organic rings.

Asphalt has been used for many years in road-paving applications as well as numerous other uses calling for strong, inert physical and chemical properties such as roofing and the like. An extensive field of use for asphalt now resides in road-paving applications in which the asphalt is modified with fillers, and specifically glass fibers which are combined with asphalt or asphalt plus aggregate to increase the strength and wear resistance of road pavements. One of the difficulties, however, in combining glass, either in the form of glass fibers or in the form of fragments of glass, stems from the fact that glass is a highly hydrophilic material. Asphalt, on the other hand, since it is a petroleum derivative, is a highly hydrophobic material. Thus, there exists a basic incompatibility between glass fibers and asphalt by reason of their chemical nature. As a result, it has been difficult to establish any bond, either physical or chemical, between asphalt and glass, and notably glass fibers.

It is known, as described in U.S. Pat. No. 4,038,102, that the compatibility between asphalt and aggregate used as a filler for the asphalt can be increased by combining with the asphalt an ether amine alone or in combination with an alkanolamine. That technique, however, is believed to be unsuitable for securing a chemical bond between glass fibers and asphalt with which the glass fibers are combined as reinforcement. Without limiting this invention as to theory, it is believed that one of the primary difficulties with the ether amines employed according to the above-identified patent stems from the fact that they are incapable of imparting to the asphalt functional groups, which can provide a reactive site to bond glass fiber surfaces to asphalt in the manufacture of glass fiber reinforced asphalt systems.

It is accordingly an object of this invention to provide a chemically modified asphalt composition which overcomes the disadvantages described above.

It is a more specific object of this invention to provide a modified asphalt wherein functional groups containing labile hydrogen atoms are introduced to the condensed hydrocarbon rings of the asphalt to thereby afford reactive sites to chemically bond asphalts to reinforcements therefor, including glass fibers.

The concepts of the present invention reside in chemically modified asphalt compositions wherein the asphalt is reacted with an organic compound capable of introducing to the asphalt functional groups containing labile hydrogen atoms. The functional groups having such labile hydrogen atoms introduced to the asphalt can thus serve as a reactive site to establish a secure chemical bond between the asphalt and reinforcing fillers, such as glass fibers, siliceous aggregate or combinations thereof blended with the asphalt in reinforced asphalt systems.

In accordance with one embodiment of the invention, asphalt is chemically modified by reaction with ammonia to introduce primary amino groups to the condensed hydrocarbon rings contained in the asphalt. Without limiting this invention as to theory, it is believed that the ammonia adds across the carbon-to-carbon double bonds contained in the asphalt in accordance with the following:

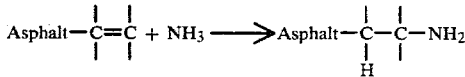

Thus, the primary amino group introduced to the asphalt, and chemically bonded thereto, is thus capable of serving as a reactive site with coupling agents and the like to secure a chemical bond between the condensed hydrocarbon rings of the asphalt and fillers blended with the asphalt.

As will be appreciated by those skilled in the art, the concepts of this invention provide a different chemical effect as compared to that afforded by U.S. Pat. No. 4,038,102. The ether amines utilized by the patentees are believed to be capable of reaction with ethylenic unsaturation contained in the asphalt material, but they are incapable of providing a reactive group. Again, without limiting as to theory, it is believed that the amino group of the ether amines taught by the foregoing patent react with ethylenic unsaturation to form a functional group according to the following equation:

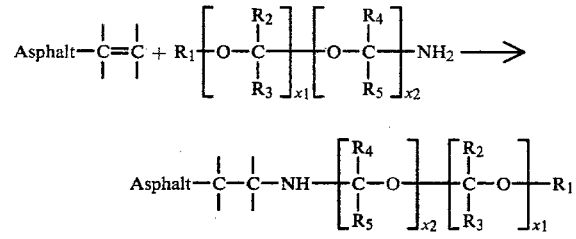

wherein $R_1$, $R_2$, $R_3$, $R_4$, $R_5$, $R_6$, $x_1$ and $x_2$ have the meaning as described in the foregoing patent. The amine group of the ether amines, it will be observed, serves to bond the ether amine to the asphalt, thereby leaving no functional group to serve as a reactive site to promote the adhesion of the asphalt to reinforcing materials. Thus, the effect achieved in U.S. Pat. No. 4,038,102 is purely a physical one, the oxyalkylene groups of the ether amine serving to impart a limited degree of hydrophilic character to the asphalt.

In the practice of this invention, use can be made of other amine compounds in lieu of the ammonia described above. Preferred are polyalkylene amines having the formula:

$$H_2N-(CH_2)_y-NH-[(CH_2)_2-NH-]_aH$$

wherein y is an integer from 2 to 6, z is an integer from 2 to 6 and a is 0 or an integer from 1 to 6. Representative polyalkylene amines include ethylene diamine, diethylene triamine, triethylene tetramine, etc.

In carrying out the reaction between ammonia or the polyalkylene amines described above, various reaction conditions can be used. It is found that best results are usually achieved when the asphalt is blended with the ammonia or the amine at high temperatures, preferably temperatures ranging from 100°-500° C. It is sometimes desirable to dissolve the asphalt in an aromatic solvent, inert to ammonia and the polyalkylene amines, and then reflux the ammonia or polyalkylene amine with the asphalt in solution. In the case of ammonia, it is also possible to distribute the ammonia in gaseous form through asphalt maintained at an elevated temperature as described above to promote the reaction between the ammonia and the ethylenic unsaturation of the asphalt.

In carrying out the reaction between ammonia or amines as described above, use can be made of asphalt or blown asphalt. As is understood by those skilled in the art, blown asphalt is an asphalt which has been oxidized by heating it and then passing air or a like oxygen-containing gas through the asphalt while maintained at an elevated temperature. The primary difference of blown asphalt as compared to ordinary asphalt stems from the fact that the softening point of blown asphalt is increased. It has been postulated that the oxidation of the asphalt brings about further condensation of aromatic and cyclic hydrocarbon rings contained in the asphalt to form a greater proportion of higher molecular weight components.

The relative proportions between the asphalt and the ammonia or polyalkylene amine as described above can be varied within relatively wide limits. In general, best results are obtained when the ammonia or polyalkylene amine are used in an amount ranging from 0.001% to about 10% by weight based upon the weight of the asphalt. Asphalts modified in that manner can contain up to about 8% nitrogen based on the weight of the chemically modified asphalt. Greater proportions can be used if desirable, but it has been found that there is frequently no advantage in using such greater quantities. When use is made of blown asphalt instead of untreated asphalt, the blown asphalt generally has an oxygen content ranging up to about 5% by weight.

While not equivalent to the ammonia or amines described above, use can also be made of other polyamines, notably aromatic polyamines having the general formula:

$$H_2N-R-NH_2$$

wherein R is a divalent aromatic group containing 6 to 15 carbon atoms. Suitable R groups include phenylene, naphthylene, etc., as well as nitrogen-containing heterocyclic groups such as a divalent pyridine group or the like. The reaction using such aromatic polyamines is carried out in the same manner as described above. It is believed, however, that the use of aromatic polyamines does tend to decrease, to a small extent, the softening point of the asphalt.

The asphalt compositions of this invention which have been chemically modified to introduce a primary amino group can be used in a variety of applications. For example, the asphalt compositions are highly suitable for use in road paving applications, and particularly road paving applications wherein the asphalt is reinforced with glass, either in the form of glass fibers or in the form of glass frit. Without limiting the present invention as to theory, it is believed that the improved compatibility between asphalt and glass surfaces, either in the form of glass fibers or other glass reinforcing members, arises from the fact that the primary amino group appended to the asphalt matrix is capable of undergoing reaction with silanol groups contained on glass surfaces. Thus, it is believed that the amine groups present in the asphalt matrix are capable of reaction with the reactive groups on the glass fiber surfaces to thereby chemically bond the asphalt to the glass fiber surfaces according to the following reaction:

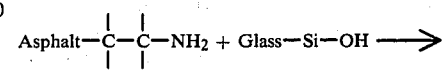

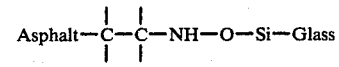

Thus, the asphalt is bonded to the glass surfaces through a siliceous oxime grouping.

In addition, the asphalt compositions of this invention can also be used in road paving applications wherein the asphalt is reinforced with a siliceous filler other than glass or in addition to glass, notably including siliceous aggregates. Again, without limiting the invention as to theory, it is believed that the same reaction as described above occurs between the primary amino group of the asphalt matrix and the silanol groups present in the surfaces of the siliceous aggregate.

In one preferred form of the invention, the asphalt compositions of this invention can be used in the treatment of glass fibers to improve the bonding relationship between the glass fibers and a wide variety of materials reinforced with glass. For example, the asphalt compositions of the invention can be applied as a thin coating to individual glass fiber filaments, or as an impregnant to bundles of glass fibers whereby the asphalt coating or impregnant serves to intertie the glass fiber surfaces with, for example, treated or untreated asphalt used in road paving applications. In this embodiment of the invention, the coated or impregnated glass fibers can advantageously be used as reinforcement for unmodified asphalt in road paving applications whereby the amino group introduced to the asphalt matrix in accordance with the concepts of this invention chemically bonds the coating or the impregnant to the glass fibers. The asphalt forming the coating or impregnant, in turn, serves to intertie the chemically modified asphalt of this invention with the untreated asphalt, the latter forming a continuous phase in which the coated or impregnated glass fibers are distributed as reinforcement.

In addition, the asphalt-treated glass fibers of this invention can also be used as reinforcement for other materials, including, but not limited to, rubber in the manufacture of glass fiber-reinforced elastomeric products, such as tires, and plastics, as in the manufacture of glass fiber-reinforced plastics.

When used in the coating or impregnation of glass fibers or bundles of glass fibers, respectively, use can be made of asphalt compositions of this invention in amounts over relatively wide ranges. Generally, the coating or impregnant is applied in an amount sufficient to constitute from 0.1 to about 50% by weight, or even higher, of the weight of the glass fibers.

It has been found, in accordance with the practice of the invention that, when employing asphalt compositions of this invention to glass fibers, either as a thin film coating on the individual glass fiber filaments or as an impregnant in bundles of glass fibers, it is desirable to heat the asphalt after it has been applied to the glass fiber surfaces. That optional heat treatment step serves to set the asphalt coating on the glass fiber surfaces, and, at the same time, to insolubilize the asphalt thereon. The heating step has been found to increase the wet strength of the asphalt-treated glass fibers significantly.

In carrying out the optional heating step as described above, it is sufficient that the asphalt-treated glass fibers be heated to a temperature ranging from 200°–500° F. depending somewhat on the softening point of the asphalt involved.

Having described the basic concepts of the present invention, reference is now made to the following examples, which are provided by way of illustration and not by way of the limitation of the practice of this invention of the preparation and use of asphalt compositions embodying the features of the invention.

EXAMPLE 1

This example illustrates the preparation of a chemically-modified asphalt composition utilizing ammonia.

A solution of 200 parts by weight of a paving grade asphalt (50/60 penetration at 77° F.) is dissolved in 50 parts by weight of toluene, and placed in a stirred flask equipped with a heater. The flask is then heated to reflux temperature and anhydrous ammonia is bubbled through the asphalt solution at reflux for two hours, when the asphalt is determined to have a nitrogen content of about 1.28%.

The heating is then discontinued and the toluene solvent removed.

EXAMPLE 2

This example illustrates the use of a polyalkylene polyamine in the practice of this invention in the preparation of chemically-modified asphalts.

Using the procedure described in Example 1, 8 parts by weight of diethylene triamine is reacted with 200 parts by weight of the paving grade asphalt identified in Example 1.

The product is found to contain 2.36% nitrogen after four hours of reaction at reflux temperature.

EXAMPLE 3

This example illustrates the use of triethylene tetramine in the practice of this invention for reaction with blown asphalt.

Using the procedure described in Example 1, a solution of 100 parts by weight of a blown asphalt having an oxygen content of 0.9% by weight is reacted with 3 parts by weight triethylene tetramine for four hours at reflux temperature.

The product is found to contain 0.78% by weight nitrogen.

EXAMPLE 4

This example illustrates the use of 1,4-diaminobenzene in the practice of this invention.

Using the procedure described in Example 1, 1,4-diaminobenzene is reacted with the asphalt described in Example 1. The product is found to contain 1.36% by weight nitrogen.

EXAMPLE 5

This example illustrates the use of asphalt compositions produced in Examples 1–4 in the treatment of glass fibers.

Each of the chemically-modified asphalts described in Examples 1–4 is formulated into a hot melt composition through which a bundle of glass fibers is immersed so that the asphalt serves to coat the individual glass fibers forming the bundle and separate the glass fibers each from the other. By immersing the bundle of glass fibers in a melt and then subjecting the bundle while immersed in the melt to a sharp bend to open the bundle of glass fibers, the asphalt completely penetrates the interstices between the individual glass fiber filaments forming the bundle. The impregnated bundles are then used in the reinforcement of a continuous phase formed of asphalt and aggregate. It is found that the reinforcing bundles, impregnated with chemically-modified asphalt compositions of Examples 1–4, are securely intertied to the asphalt forming the continuous phase of the asphalt-aggreate matrix.

As will be appreciated by those skilled in the art, glass fibers treated in this example can be in the form of individual glass fiber filaments whereby the coating is applied as a thin film coating. In either case, the amine groups present in the chemically-modified asphalt serve to securely intertie the chemically-modified asphalt coating to the glass fiber surfaces.

It will be understood that various changes and modifications can be made in the details of procecure, formulation and use without departing from the spirit of the invention, especially as defined in the following claims.

We claim:

1. Glass fibers coated with a chemically modified asphalt prepared by reaction at a temperature of 100° to 500° C. of an asphalt with a nitrogen-containing compound selected from the group consisting of (a) ammonia, (b) a polyalkylene polyamine and (c) an aromatic diamine having the formula $H_2N-R-NH_2$ wherein R is a divalent aromatic group containing 6-15 carbon atoms.

2. Glass fibers as defined in claim 1 wherein the glass fibers are in the form of individual filaments, and the coating is in the form of a thin film coating on the individual filaments.

3. Glass fibers as defined in claim 1 wherein the glass fibers are in the form of a bundle and the coating is present as an impregnant in the bundle.

* * * * *